US005917870A

United States Patent [19]
Wolf

[11] Patent Number: 5,917,870
[45] Date of Patent: Jun. 29, 1999

[54] SYNCHRONIZATION MONITORING IN A NETWORK ELEMENT

[75] Inventor: Michael Wolf, Mundelsheim, Germany

[73] Assignee: Alcatel N.V., Rijswijk, Netherlands

[21] Appl. No.: 08/560,073

[22] Filed: Nov. 17, 1995

[30] Foreign Application Priority Data

Nov. 30, 1994 [DE] Germany .............................. 44 42 506

[51] Int. Cl.⁶ ...................................................... H04L 7/00
[52] U.S. Cl. .............................. 375/356; 371/5.4; 371/30; 371/47.1; 370/503; 370/516; 375/355; 375/362
[58] Field of Search ..................................... 375/355, 356, 375/362, 375, 363, 373; 371/5.4, 30, 42, 47.1; 370/503, 516, 517

[56] References Cited

U.S. PATENT DOCUMENTS

| 4,451,917 | 5/1984 | De Coursey | 370/108 |
|---|---|---|---|
| 4,569,065 | 2/1986 | Cukier | 375/376 |
| 4,841,167 | 6/1989 | Saegusa | 307/269 |
| 5,062,124 | 10/1991 | Hayashi et al. | 375/356 |
| 5,091,907 | 2/1992 | Wettengel | 370/102 |
| 5,107,361 | 4/1992 | Kneidinger et al. | 359/135 |
| 5,200,982 | 4/1993 | Weeber | 375/118 |
| 5,206,889 | 4/1993 | Unkrich | 375/362 |

(List continued on next page.)

FOREIGN PATENT DOCUMENTS

| 4108230 | 9/1992 | Germany . |
| 4131061 | 9/1992 | Germany . |
| 4202341 | 8/1993 | Germany . |
| 200869 | 8/1985 | New Zealand . |
| 220548 | 5/1990 | New Zealand . |

OTHER PUBLICATIONS

ETSI Sub–Technical Committee TM3 "Architecture, Functional Requirements and Interfaces for the Transmission Network", Report of Meeting No. 8, Bristol, UK, Oct. 12–16, 1992, pp. 201–205.

"Digital Network Synchronization Plan/Synchronization Network Operations", *TA–NWT–000463*, Issue 2, Jun. 1993, pp. 7–1 to 7–6.

"Clocks for the Synchronized Network: Common Generic Criteria", *Bellcore Technical Reference TR–NWT–001244*, Issue 1, Jun. 1993, pp. 1–1 to 12–4.

"Synchronization and Timing of SDH Networks", W. Powell et al, *Alcatel Electrical Communication*, 4th Quarter 1993, pp. 349–358.

"Analysis of Techniques for the Reduction of Jitter Caused by SONET Pointer Adjustments", R. Kusyk et al, *IEEE Transactions on Communications*, vol. 42, No. 2/3/4, Feb./Mar./Apr. 1994, pp. 2036–2050.

"Messaufgaben an SDH–Netzelementen in Pilotphasen", H–J. Kopsch, *NTZ*, vol. 47, No. 7, 1994, pp. 488–493.

"Synchrone Digitalhierarchie und Asynchroner Transfermodus", O. Fundneider, *Telecom Praxis* Apr. 1994, pp. 29–36.

*Primary Examiner*—Welington Chin
*Assistant Examiner*—Conguan Tran
*Attorney, Agent, or Firm*—Ware, Fressola, Van Der Sluys & Adolphson LLP

[57] ABSTRACT

In digital transmission systems, such as synchronous transmission systems according to the SDH/SONET standard, there is a need to have information on the synchronization status of the system. A known approach is to monitor the pointer activity. This is disadvantageous in that because of a hysteresis in the pointer processor, information derived from the pointer activity only conditionally reflects the synchronization status. In a network element (1) according to the invention which forms part of a transmission system of the above type, at least one interface unit (2, 3, 4) contains, besides an optical-to-electrical transducer (5), a synchronization-monitoring device (6) which derives a synchronization status parameter, e.g., TIE, RMSTIE, by comparing an external clock frequency ($T_e$) with an internal clock frequency ($T_i$). For this, the synchronization-monitoring device (6) comprises a phase-comparing device (37), a memory device (25), and an evaluating device (26).

14 Claims, 2 Drawing Sheets

U.S. PATENT DOCUMENTS

| | | | |
|---|---|---|---|
| 5,220,295 | 6/1993 | Glover et al. | 331/25 |
| 5,255,293 | 10/1993 | Archer et al. | 375/118 |
| 5,258,720 | 11/1993 | Tanis et al. | 328/133 |
| 5,272,391 | 12/1993 | Ampe et al. | 307/269 |
| 5,323,255 | 6/1994 | Sierens et al. | 359/137 |
| 5,341,404 | 8/1994 | Sevenhans et al. | 375/106 |
| 5,404,380 | 4/1995 | Powell et al. | 375/363 |
| 5,430,772 | 7/1995 | Lee et al. | 375/362 |
| 5,461,380 | 10/1995 | Peters et al. | 341/100 |
| 5,519,737 | 5/1996 | Brun et al. | 375/376 |
| 5,535,521 | 7/1996 | Sugawara | 375/355 |
| 5,555,278 | 9/1996 | Kondoh | 375/373 |
| 5,657,318 | 8/1997 | Ohmori et al. | 370/516 |

SYNCHRONIZATION MONITORING IN A NETWORK ELEMENT

TECHNICAL FIELD

The present invention relates to a network element for a digital transmission system and, more particularly, a network element having at least one interface unit which may include a device for converting an incoming optical signal of a first clock frequency to a corresponding electrical signal of the same clock frequency.

BACKGROUND OF THE INVENTION

Such a digital transmission system is, for example, a synchronous transmission system according to the SDH/SONET standard. In such a digital transmission system, individual network elements are interconnected by different transmission media (e.g., copper cables, optical fiber waveguides, or radio links).

The connection between a network element and a transmission medium is provided by interface units ("network node interfaces"), which are known, for example, from ITU-T Recommendations G.703 and G.957. Recommendation G.703 specifies electrical characteristics of such interface units, and Recommendation G.957 specifies optical characteristics of such units. In an interface unit connected to an optical fiber waveguide, incoming optical signals, for example, are converted to electric signals by an optical-to-electrical transducer. Consequently, outgoing electrical signals are converted to optical signals by an electrical-to-optical transducer. During such a conversion, the clock frequency of the respective signal does not change.

In each network element, which is a cross-connect, for example, an internal clock frequency serves as a clock reference. Deviations of the clock frequency of an incoming signal from this internal clock frequency gives information about the synchronization status of the transmission system. An overview of the subject of synchronization is given in an article by W. E. Powell et al, "Synchronization and Timing of SDH Networks", Electrical Communication (Alcatel), 4th Quarter 1993, pages 349 to 358.

To monitor the synchronization status, it is known, (Report on ETSI-TM3 Meeting in BristoL, October 1992, page 205) to monitor the pointer activity. Monitoring the synchronization status with the aid of the pointer activity is required in BeLLcore TA-NWT-000 436. Such monitoring is disadvantageous in that because of an unstandardized hysteresis associated with the pointer processor, the information derived from the pointer activity permits only qualified statements about the synchronization status.

DISCLOSURE OF THE INVENTION

It is the object of the invention to provide a network element for a digital transmission system wherein the synchronization status is monitored in another manner.

According to a first aspect of the present invention, a network element for a digital transmission system comprises at least one interface unit having a synchronization-monitoring device which compares a first clock frequency of an incoming signal with a second clock frequency fixed in the network element to derive at least one synchronization status parameter.

In accordance with a second aspect of the present invention, a network element for a digital transmission system comprises at least one interface unit having a device for converting an incoming optical signal of a first clock frequency to a corresponding electrical signal of the same clock frequency, wherein the interface unit further includes a synchronization-monitoring device which compares the first clock frequency with a second clock frequency fixed in the network element to derive at least one synchronization status parameter.

According further to either the first or second aspects of the present invention, the synchronization-monitoring device of the network element comprises a phase-comparing device for comparing the first and second clock frequencies within a predetermined time interval, a memory device for storing difference values determined by the phase-comparing device, and an evaluating device for evaluating values read from the memory device at predetermined time intervals. The phase-comparing device may include at least one counting device and a control device for reading from the counting device at regular time intervals and then resetting the counting device. The counting device may be a 16-stage counter, for example.

One advantage of the invention is that incorrect synchronization can be detected at an early time, so that preventive measures can be taken.

A second advantage of the invention is that with the aid of the synchronization status, decisions are simplified as to how an existing transmission system can be expanded, possibly without reorganization of the synchronization architecture.

A third advantage of the invention is that a network operator can continuously check a synchronization performance guaranteed to his customer.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
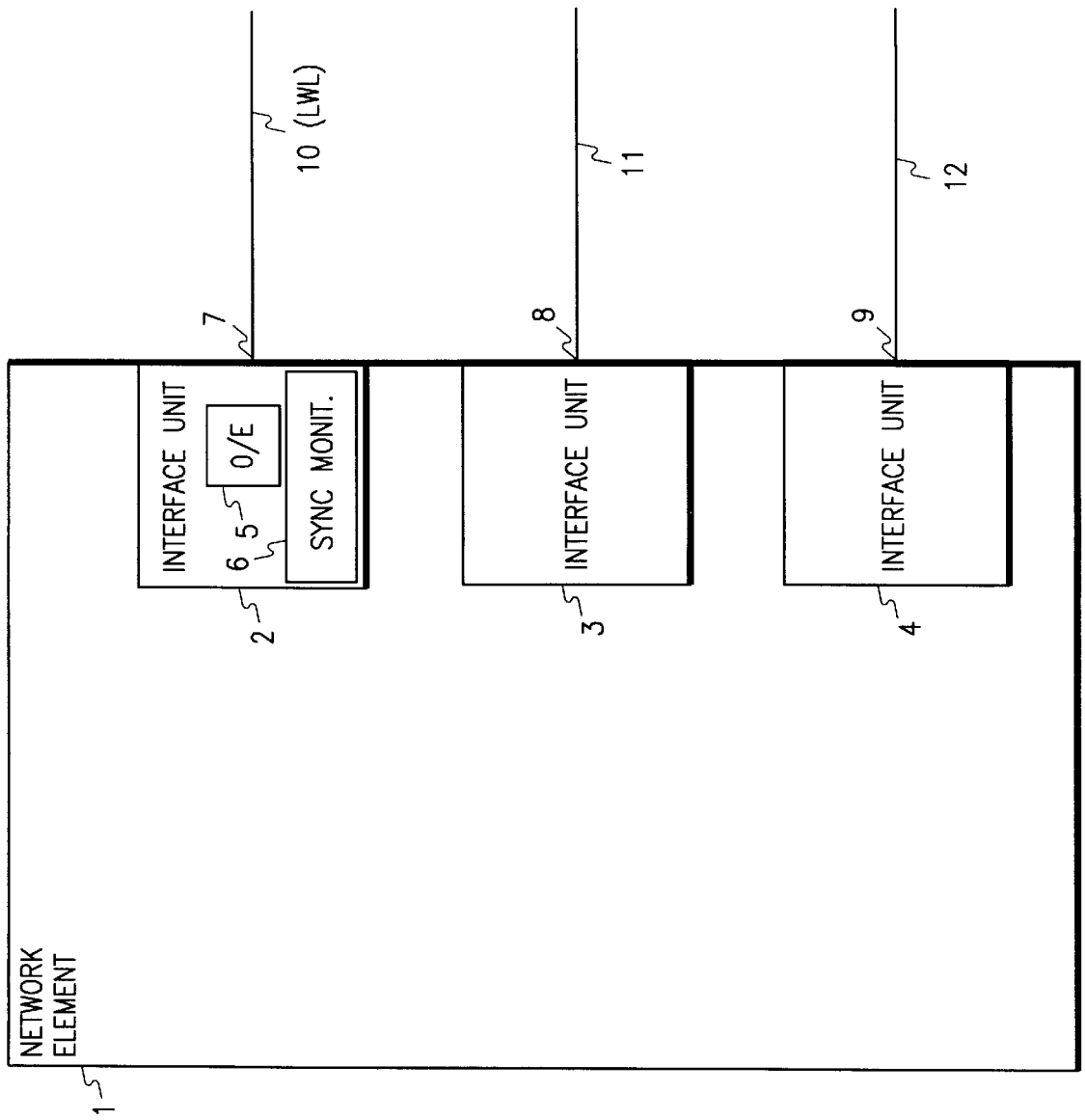
FIG. 1 is a block diagram of a network element according to the invention with a synchronization-monitoring device.

Referring to FIG. 1, there is shown a block diagram of a network element 1 according to the invention with a synchronization-monitoring device 6. This network element 1 is, for example, a cross-connect in an exchange. The network element 1 has three interface units 2, 3, and 4, which are connected to transmission media 10, 11, and 12 via ports 7, 8, and 9, respectively. The interface unit 2, which contains an optical-to-electrical transducer 5 and the synchronization-monitoring device 6, is connected to an optical fiber waveguide 10 (transmission medium) via the port 7.

The optical-to-electrical transducer 5 converts an optical signal of a first clock frequency $T_e$, which arrives over the optical fiber waveguide 10, to a corresponding electric signal of the same clock frequency $T_e$. This first clock frequency $T_e$ will hereinafter be referred to as the "external clock frequency". This external clock frequency $T_e$ may be divided in the network element 1 according to a predetermined division ratio. Despite this division, however, an unambiguous inference to the external clock frequency $T_e$ is always possible. A comparison which will be explained in the following is not affected by this division, i.e., even after such a division, a comparison takes place between the external frequency $T_e$, and a second clock frequncy. In the network element 1, and hence in the interface units 2, 3, 4, a common second clock frequency $T_i$ is fixed, which will hereinafter be referred to as the "internal clock frequency".

In FIG. 1, the synchronization-monitoring device 6 is contained in the interface unit 2, but it may also be contained in at least one of the other interface units 3, 4. The synchronization-monitoring device 6 is shown in block-diagram form in FIG. 2. It has a phasecomparing device 37, a memory device 25, and an evaluating device 26. The phase-comparing device 37 has two AND gates 23, 24, two counting devices 21, 22, and a control device 20. The AND gate 23 is connected to the counting device 21 by a line 31, and the AND gate 24 is connected to the counting device 22 by a line 32. The counting devices 21 and 22 are connected to the control device 20 by data links 29 and 30, respectively.

The control device 20 is connected to the counting device 21 by a line 27 and to the counting device 22 by a line 28.

A divider 38 is designed to reduce the internal clock frequency $T_i$ to a clock frequency $T_{io}$. This clock frequency $T_{io}$ thus defines a time interval. The divider 38 can be located at any point of the network element; in FIG. 2, it is located outside the synchronization-monitoring device 6.

As the clock frequency $T_{io}$ is derived from the internal clock frequency $T_i$, the comparison between the clock frequency $T_{io}$ and the, possibly divided, external clock frequency $T_e$ in the phase-comparing device 37 is to be understood as if a comparison were made between the internal clock frequency $T_i$ and the external clock frequency $T_e$. The inputs to the AND gate 23 are the external clock frequency $T_e$ and the clock frequency $T_{io}$. The signal of clock frequency $T_{io}$ is a sequence of logic O and 1 states of equal duration. The inputs to the AND gate 24 are the external clock frequency $T_e$ and the clock frequency $T_{io}$. One input of the AND gate 24 is an inverting input to invert the signal of frequency $T_{io}$. The clock frequency $T_{io}$ is also applied to the control device 20 over a line 36.

Figure 2:
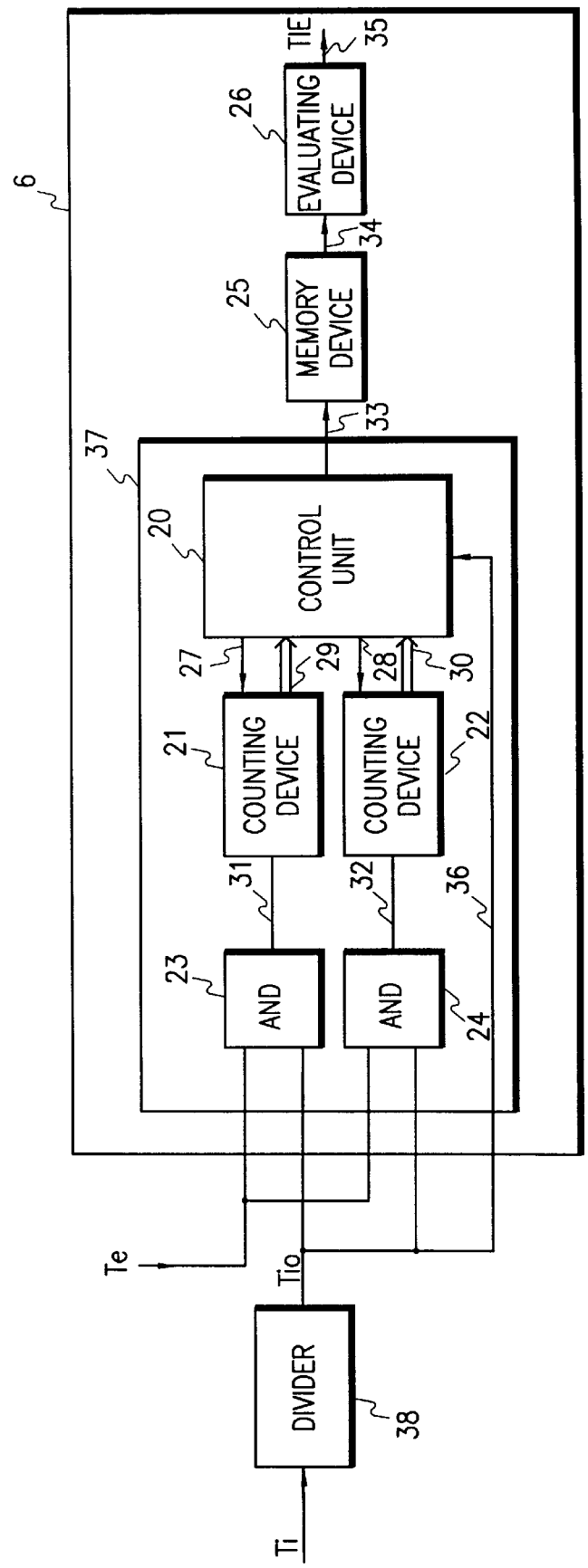
FIG. 2 is a block diagram of a synchronization-monitoring device.

The control device 20 of the phase-comparing device 37 is connected to the memory device 25 by a line 33, and the memory device 25 is connected to the evaluating device 26 by a line 34. The evaluating device is a computer in which an evaluation program is executed. The evaluating device 26 forms part of the synchronization-monitoring device 6, no matter where it is located, i.e., it may be located in the interface unit 2 (FIG. 1) or at a monitoring center. There, the evaluation results (e.g., TIE) can be displayed on a screen. This is indicated in FIG. 2 by a signal on line 35 at the evaluating device 26.

The operation of the synchronization-monitoring device 6 is as follows.

As mentioned above, the clock frequency $T_{io}$ defines a time interval, e.g., 1.024 s. The AND gate 23 only gives a "1" output if both inputs ($T_e$, $T_{io}$) are also "1". The counting device 21 counts how often that was the case in the time interval. To perform uninterrupted measurements, the modified AND gate 24 is provided, i.e., this gate makes it possible to perform a comparison even if the signal of clock frequency $T_{io}$ is in a logic O state. Thus, the counting device 22 also counts how often the input signals ($T_e$, $T_{io}$) are equal in the measurement interval.

The control device 20 is supplied with the clock frequency $T_{io}$ so that at the end of each time interval, the control device 20 interrogates the counting devices 21, 22, transfers the number of pulses counted per time interval (count) to the memory device 25, and resets the counting devices 21, 22.

The number of pulses counted per time interval are a measure of the clock frequency, and thus a measure of the clock-frequency deviation to be determined. For a clock-frequency deviation of 4.6 ppm (parts per million), the count is 733 units away from a nominal value. The number of pulses counted per time interval thus represent difference values determined by the phase-comparing device 37.

To determine the clock-frequency deviation, it is not necessary to know the absolute count; it suffices to evaluate the least significant bits of the count.

From this it follows that two bytes suffice to represent the count.

For a short-term-stability analysis, the stored amount of data is, for example, 180 kbytes per day. For a long-term-stability analysis, it is possible to reduce the amount of data by a factor of 10–1000, which gives 500–5 kbytes per month, for example.

If the fixed time interval is 1.024 s long, two 16-stage binary counting device 21, 22 are needed. The values stored in the memory device 25 can be evaluated statistically: The evaluating device 25 interrogates the memory device 25 at fixed time intervals, i.e., the memory device 25 is polled. As the evaluation result, statistical synchronization status parameters are then obtained, such as time interval error (TIE), root mean square TIE (RMS TIE), maximum relative TIE (MRTIE), and time deviation (TDEV). These parameters and their determination are known, for example, from the above-mentioned article by R. W. Cubbage, especially pages 355 to 357, or from BeLLcore TECHNICAL REFERENCE TR-NWT-001244, especially pages 2-6 to 2-9.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A network element for a digital transmission system, comprising at least one interface unit, characterized in that the interface unit (2, 3, 4) includes a synchronization monitoring device (6) for comparing a first clock frequency ($T_e$) of an incoming signal with a second clock frequency ($T_i$) of a signal fixed in the network element (1) for providing at least one synchronization status parameter signal, and in that the synchronization-monitoring device (6) comprises a phase-comparing device (37) for said comparing the first clock frequency ($T_e$) with the second clock frequency ($T_i$) within a predetermined time interval for providing a difference value signal (33), a memory device (25) for storing said difference value signal, and an evaluating device (26) for evaluating said difference value signal read from the memory device at predetermined time intervals for providing said synchronization status parameter signal.

2. A network element as claimed in claim 1, characterized in that the phase-comparing device (37) includes at least one counting device (21, 22) and a control device (20) for reading from the counting device (21, 22) at regular time intervals and then resetting the counting device.

3. A network element as claimed in claim 2, characterized in that the counting device (21, 22) is a 16-stage counter.

4. A network element for a digital transmission system comprising at least one interface unit (2, 3, 4) which includes a device (5) for converting an incoming optical signal of a first clock frequency ($T_e$) to a corresponding electric signal of the same clock frequency ($T_e$) characterized in that the interface unit (2) further includes a synchronization-monitoring device (6) for comparing the first clock frequency ($T_e$) with a second clock frequency ($T_i$) of a signal fixed in the network element (1) for providing at least one synchronization status parameter signal and in that the synchronization-monitoring device (6) comprises a phase-comparing device (37) for said comparing the first clock frequency ($T_e$) with the second clock frequency ($T_i$) within a predetermined time interval for providing a difference value signal (33), a memory device (25) for storing said difference value signal, and an evaluating device (26) for evaluating said value signal read from the memory device at predetermined time intervals for providing said synchronization status parameter signal.

5. A network element as claimed in claim 4, characterized in that the phase-comparing device (37) includes at least one counting device (21, 22) and a control device (20) for reading from the counting device (21, 22) at regular time intervals and then resetting the counting device.

6. A network element as claimed in claim 5, characterized in that the counting device (21, 22) is a 16-stage counter.

7. A network element for a digital transmission system, comprising at least one interface unit, characterized in that the interface unit (2, 3, 4) includes a synchronization monitoring device (6) for comparing a first clock frequency ($T_e$) of an incoming signal with a second clock frequency ($T_i$) of a signal fixed in the network element (1) for obtaining a difference value signal (33), said synchronization monitoring device further evaluating said difference value signal statistically at fixed time intervals to provide at least one statistical synchronization status parameter signal.

8. A network element as claimed in claim 7, characterized in that the synchronization-monitoring device (6) comprises a phase-comparing device (37) for said comparing the first clock frequency ($T_e$) with the second clock frequency ($T_i$) within a predetermined time interval for providing a difference value signal (33), a memory device (25) for storing said difference value signal, and an evaluating device (26) for evaluating said difference value signal read from the memory device at predetermined time intervals for providing said synchronization status parameter signal.

9. A network element as claimed in claim 7, characterized in that the phase-comparing device (37) includes at least one counting device (21, 22) and a control device (20) for reading from the counting device (21, 22) at regular time intervals and then resetting the counting device.

10. A network element as claimed in claim 9, characterized in that the counting device (21, 22) is a 16-stage counter.

11. A network element for a digital transmission system, comprising at least one interface unit (2, 3, 4) which includes a device (5) for converting an incoming optical signal of a first clock frequency ($T_e$) to a corresponding electric signal of the same clock frequency ($T_e$), characterized in that the interface unit (2) further includes a synchronization-monitoring device (6) for comparing the first clock frequency ($T_e$) with a second clock frequency ($T_i$) of a signal fixed in the network element (1) for obtaining a difference value signal (33), said synchronization monitoring device further evaluating said difference value signal statistically at fixed time intervals to provide at least one statistical synchronization status parameter signal.

12. A network element as claimed in claim 11, characterized in that the synchronization-monitoring device (6) comprises a phase-comparing device (37) for said comparing the first clock frequency ($T_e$) with the second clock frequency ($T_i$) within a predetermined time interval for providing a difference value signal (33), a memory device (25) for storing said difference value signal, and an evaluating device (26) for evaluating said value signal read from the memory device at predetermined time intervals for providing said synchronization status parameter signal comprising at least one interface unit (2, 3, 4) which includes a device (5) for converting an incoming optical signal of a first clock frequency ($T_e$) to a corresponding electric signal of the same clock frequency ($T_e$), characterized in that the interface unit (2) further includes a synchronizationmonitoring device (6) for comparing the first clock frequency ($T_e$) with a second clock frequency ($T_i$) of a signal fixed in the network element (1) for obtaining a difference value signal (33); said synchronization monitoring device further evaluating said difference value signal statistically at fixed time intervals to provide at least one statistical synchronization status parameter signal.

13. A network element as claimed in claim 11, characterized in that the phase-comparing device (37) includes at least one counting device (21, 22) and a control device (20) for reading from the counting device (21, 22) at regular time intervals and then resetting the counting device.

14. A network element as claimed in claim 13, characterized in that the counting device (21, 22) is a 16-stage counter.

\* \* \* \* \*

UNITED STATES PATENT AND TRADEMARK OFFICE
CERTIFICATE OF CORRECTION

PATENT NO. : 5,917,870
DATED : June 29, 1999
INVENTOR(S) : M. Wolf

It is certified that error appears in the above-identified patent and that said Letters Patent is hereby corrected as shown below:

At col. 5, line 2, please insert a comma after "$(T_e)$".

At col. 6, line 31, please insert a hyphen between "synchronization" and "monitoring".

Signed and Sealed this

Eighteenth Day of April, 2000

Attest:

Q. TODD DICKINSON

*Attesting Officer*   *Director of Patents and Trademarks*